Figure 1:
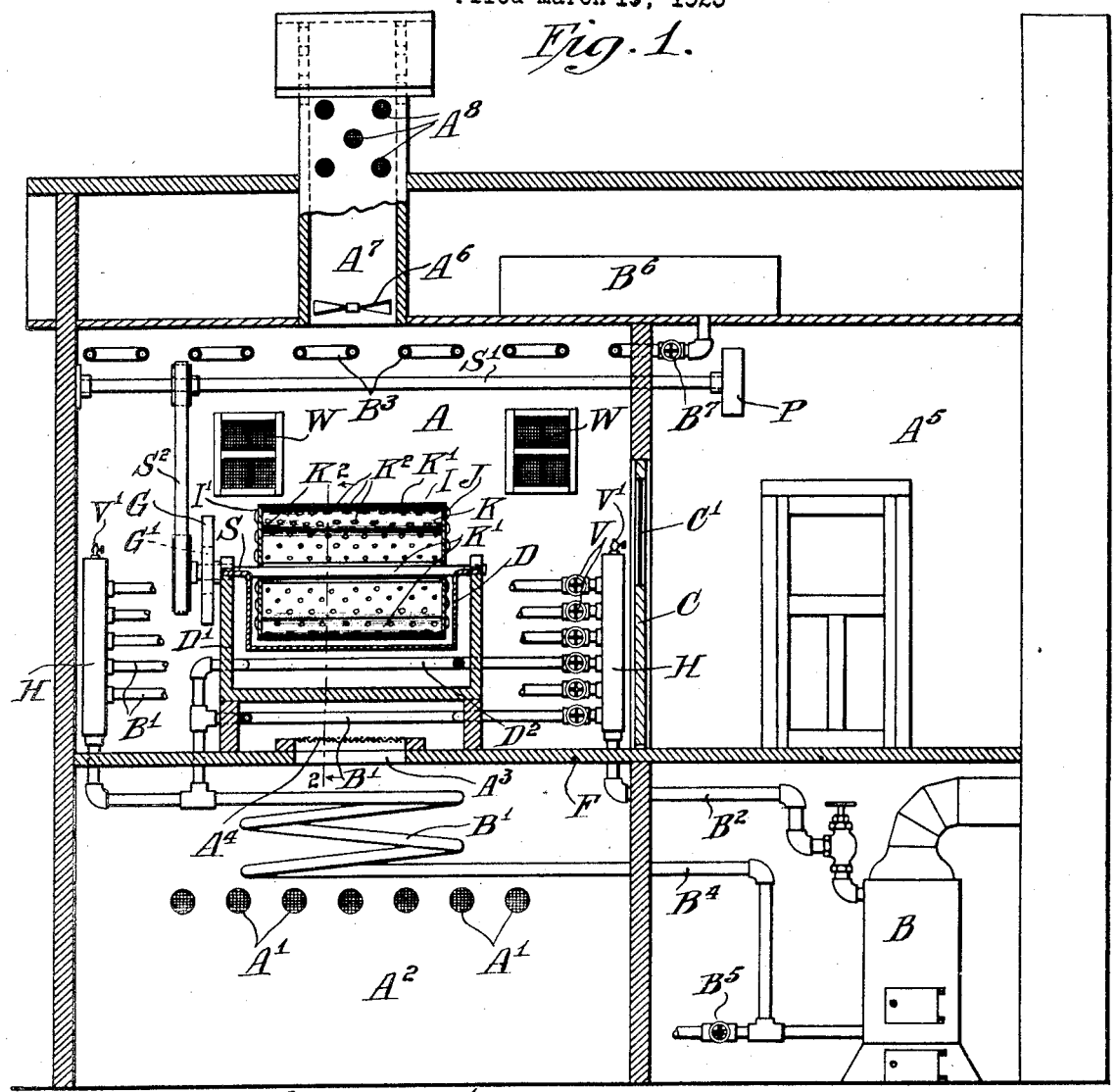

Feb. 7, 1928.  1,658,168

J. M. W. KITCHEN

METHOD FOR TREATING LACTIC FLUIDS

Filed March 19, 1923

INVENTOR
Joseph Moses Ward Kitchen.

Patented Feb. 7, 1928.

1,658,168

UNITED STATES PATENT OFFICE.

JOSEPH MOSES WARD KITCHEN, OF EAST ORANGE, NEW JERSEY.

METHOD FOR TREATING LACTIC FLUIDS.

Application filed March 19, 1923. Serial No. 626,115.

The general purpose of the present invention is to secure improved sanitary and edible character in public milk, cream and butter supplies, at prices within the purchasing means of the masses. It is demonstrable that the public supplies of these dairy products are not as good as they should be, nor as good as can be produced practically.

The special object of the invention is to overcome various defects still existing in milk, cream and butter, due to old methods of producing and treating supplies of those dairy products; none of which products as openly marketed at the present time, can be known to be assuredly safe, and entirely wholesome. The disclosures consequent to the investigation of this matter by governmental bodies and others, indicate that a considerably large proportion of such dairy products is infected with virulent germs of bovine tuberculosis, that other infections of milk-borne pathogenic bacteria are occasional, and that existing other contaminations are widespread.

There being no practical method known as to in what parts of public dairy products these infections and other contaminations may be found, it is clear that the entire supply should be treated, in fully meeting and overcoming the situation. The present invention meets and remedies that menace.

It is known that such infections accidentally occur without being anticipated, or recognized until after the results produced by such infections are observable; and that the efforts hitherto made to meet the situation have been only partly successful, notwithstanding that for many years past the world's best scientists and practitioners have been at work in efforts to overcome the situation, which as a whole is destructive of human life, especially of infants and older, specially susceptible persons.

Soon after the bacterial discoveries of Pasteur, it was surmised that much of the infantile mortality occurring in bottle fed babies was due to the presence in milk of disease producing bacteria; and the assumption was general that such result was due to the direct action of those germs in the alimentary tract. That belief was followed by the campaign for so-called "clean milk;" which movement was based upon adopted methods of assumedly avoiding germinal infections of milk during its production. The practice of that method has resulted in a considerably improved, but still imperfect character in a small part of the public milk supply, commonly known as "certified" milk; which milk is consumed by less than 2% of the milk consuming population. This small consumption is mostly due to the necessarily high cost of producing "certified" milk. Furthermore, inasmuch as that method largely depends for commercial recognition on the existence of the prejudice held by a few, in favor of the use of raw milk for infants, such raw milk cannot commercially depend upon a large consumption; for raw milk can never be known to be absolutely free from possibly dangerous pathogenic infections, nor be entirely free from incubative accumulations of ordinarily undetectable or detectable products of the growth of the many types of bacteria that always more or less gain access to milk in its production. Furthermore, the reproductive growth of milk infections results in the production and accumulation in milk, cream and butter of so-called putrefactive excretory, and decomposition matters, the presence of which in dairy products, it is the aim of this invention to prevent.

A recognition of the above stated situation by me, has resulted in my evolving methods and means to overcome the situation. A further basis and incentive in evolving the present invention, has been certain discoveries exclusively perceived by me in connection with special experimental investigations in the production of milk, cream and butter. These discoveries comprise:

1. A perception that a considerable part of the putrid volatile constituents more or less present in milk and butter, originate in the glands of the cow's hide, it being there produced by putrefactive fermentation in those glands and is inbreathed by and is transferred to the bodily fluids of the cow, and transfused into her milk while the milk is being produced, and is not formed by bacterial action in the milk after its production, as had been widely taught.

2. A perception that accumulations of poisonous products of putrefactive fermentations in, and decomposition splitting of dead bacteria in milk as the result of senility or Pasteurization, had probably been the direct influence in producing much of the infantile mortality of the past, rather than the direct influence of bacteria directly acting in the alimentary tract. Abundant data confirms that conclusion.

3. A perception that all milk is more or less putrefactively infected at the time of its production.

4. A perception that refrigeration of butter at the ordinary temperatures secured by icing, results in degrading changes in the character of butter, within one week.

5. A perception that putrid flavors may be due to uncontrolled temperature influences acting on milk, cream and butter, which result in the proliferation of the usually unpreventable primary putrefactive infections which always more or less occur at the time of the production of milk.

6. A perception that cream, if held at very low temperatures may lose bad, so-called barn taints and off-flavors.

7. A perception that all butter made by methods previously practised, may be more or less contaminated with the ferment products of putrefactive fermentations, even when those contaminations are masked by low temperature in the butter, or by its solidity of character.

8. A perception that butter made from pasteurized cream in the ordinary way, cannot be known to be absolutely safe because of possible viable infections introduced in the constituents of butter, including the cream, salt, coloring matter and "starter."

These discovered basic facts led to my evolution of the following inventive ideas, viz: I apply the principle of prolonged completely exhaustive aeration of milk or cream, under such conditions of intense temperature influences, either hot or cold, as will substantially entirely inhibit bacterial fermentations in and will overcome other conditions that result in aerial or other new infections of milk and cream during their aeration.

I have devised and use a special apparatus for carrying out continued connected aerating and Pasteurizing processes.

I apply the idea of immediately after the production of milk, and before it has lost its self-preservative character, to so deeply refrigerate the milk that substantially no fermentation can occur in it when thus refrigerated; and furthermore, to so continuously apply either hot or cold temperature influences to the milk between the time of its production and the time of its consumption, as will give to and maintain in the milk, substantially all of the beneficial qualities pertaining to pure fresh, unfermented milk.

The main object of my invention has been to prevent in milk the accumulation of so-called putrid products, that at least are not wholesome, and some of which it is known may be dangerous to health and even to life, tho such products may not be ordinarily recognizable to sight, smell or taste; and to prevent the formation of decomposition products in milk. My improved practice, simple as it appears, has apparently never before been practically accomplished; and this neglect has probably cost the world an enormous aggregate loss of infantile life. I have devised and use a final container that overcomes the common infections of container closures and which grow thru the cardboard seals of the generally used final containers, and which hence infects the milk in those containers. I apply the idea of entirely preventing the formation of putrefactive ferment products in cream, by early and continuous deep refrigeration of the cream up to the time of its consumption, or its churning if butter is made from it. I apply a new method of aerating milk and cream which will be hereinafter more particularly described. I also apply a new method of refrigerating milk and cream that is particularly hereinafter described. I apply a new method of Pasteurizing milk and cream in the final container, and thus overcome the usual objectionable changes in taste and chemical character that occur in Pasteurized milk, by preheating the milk in bulk, at temperatures lower than a Pasteurizing temperature, followed by a complete Pasteurizing heating of the milk in the final container. I apply the idea of subjecting extended surfaces of milk, cream or butter to atmospheric temperature influences, either hot or cold, that will substantially inhibit germinal growths. I apply the idea of accumulating preservative frigid influence in milk itself, in place of a more or less intermittently maintained external application of refrigerative influences; and of distributing milk in insulated cases that protect the milk from damaging atmospheric temperatures.

To secure the full and complete aim of this invention, it is necessary to bring into co-operative performance, all the method steps and instrumentalities required. Therefore, the invention consists of a number of new method steps and new apparatus, as well as combinations of new and old step-performances, hitherto unpracticed. One unitary product of the methods is, milk of a character that can be known to be entirely free from live pathogenic germs, and accumulations of unwholesome or dangerous putrefactive ferment and decomposition products, and which is also free from volatile flavors and odors objectionable to taste and smell. The character of such milk is superior to that of any milk previously produced, and sold on the open market, and yet this superior milk can sold for a price that is not in advance of one-fifth of the extra cost of producing so-called "certified" milk, above the cost of producing ordinary low grades of purveyed milks Important details of the invention are: preventing low temperature fermentative growths of germs that primarily infect milk; preventing accumulation of bacterial excretions and products of albuminous decompositions in milk; securing increased efficiency in destroying pathogenic germs; eliminating from milk, cream and butter derived from cream, objectionable odors and tastes; and preventing additional infections of milk and cream during their treatment and distribution. In particular, the aim of the invention is to overcome defects in lacteal fluids causative of infant and adult diseases and mortality. I claim that I am the first to perceive the prudence and desirability of entirely preventing all bacterial growths in milk at all stages of its handling, and thus avoid the accumulation in milk of the bacterial excretory and decomposition products of such growths in any quantity, whether slowly or quickly produced.

For a very considerable part of the public milk supply, several days intervene between its production and consumption; and merely on this account alone, and because of defective control of the temperatures used in protecting milk from fermentations, the accumulated amounts of ferment products produced during the time of its treatment, conveyance and distribution, may be materially harmful if consumed in sufficient amounts, and for a sufficiently long time, especially by infants.

Under prevailing practical economic and other conditions, it is impossible to produce absolutely pure milk at the place of its production, under any conditions; and much less, to avoid more or less considerable bacterial infections of milk in the production of the largest part of the public milk supply. The most cleanly method that has been practiced, which produces so-called "certified" milk, produces what is always somewhat contaminated with objectionable matters, and sometimes thru unanticipated and unperceived accident, dangerously so. Less than 2% of the public milk supply has even that relative excellence. The present invention overcomes this last stated situation, assuredly and economically.

It is possible to produce reasonably clean market milk as a general rule; and hence, my method preferably commences with the treatment of milk that has been produced with reasonable conditions as to care and cleanliness in avoiding gross contaminations. In carrying out the present invention in its fullness, I practice a continuous, coactive number of steps in treating lactic fluids at all stages of their treatment from a time closely approximating the time that milk is produced, and before the milk has lost its special power to repress fermentation, up to the time of the delivery to the consumer of any lacteal product, including milk, cream and butter. Such treatment is preferably successively applied at the farm, at the point of shipment by rail, during its shipment by rail, at the railroad receiving station, at the milk distributing or butter making plant, and during distribution to the consumer. All steps of the method must coactively be taken to secure the fullest aim of the invention. These steps may, and usually do include: clarification, aeration, temperature control, Pasteurization, bottling or packaging, and distribution. The sequence in taking the steps, I may vary according to convenience or special attending conditions. Most of the steps I practice in manner different from prior practices.

Clarification.

My method of treating milk comprises any known method of clarification. Preferably, this step should be taken at the point of the production of the milk, and immediately after the drawing of the milk while the milk retains its animal heat. In very clean milk, the step may be omitted. Usually, the step is most conveniently carried out at the distributing plant.

Temperature control.

It is a generally recognized fact that cooling milk tends to preserve it; but there has been no general recognition as to the best degree of frigidity at which the milk should be cooled and held, and as to the best times at which to refrigerate the milk to secure the best results. Up to the present time, the principal aim of commerical dealers has been to prevent the souring of milk due to the proliferation in it of the acid forming bacteria that propagate most freely at temperatures ranging from 60° F. to 80° F. and upward. Methods of cooling milk thru the use of ice are usually effective in preventing milk from quickly becoming sour; but Pasteurization has been widely practiced in preventing the formation of acids in milk. Temperatures of from 45° to 60° have ordinarily been regarded as sufficiently low to adequately preserve milk; and notwithstanding that it is a scientific fact now known, that bacteria proliferate at temperatures lower than 40° F., and possibly grow slowly at or even below the freezing point of milk. Temperatures lower than 45° F. have been used to prevent the slow souring of milk in its long holding, especially if shipped long distances on sea voyages. Such practice however leaves out of account the fact that ferment germs of various types, such as are found abundantly in cow stables, as well as some other micro-organisms which do not form acid products, will grow in milk at lower temperature than the acid forming germs, and that such germs, which include common hay bacteria, will grow in milk before the milk has been Pasteurized if only moderately chilled; or after the milk has been Pasteurized. The common practice has been to not sufficiently refrigerate milk immediately after its production, and both previous to and after its Pasteurization at temperatures sufficiently low to prevent the reproductive growth in the milk of bacteria that are not destroyed by Pasteurization, and thru which bacteria growth, ferment products may form that result in damage to the health of consumers. Milk also becomes more or less nutritively unwholesome, coincidently with decomposition changes that occur in its nutrient constituents, and aside from the formation of products of putrefactive and pathogenic infections. Very deep, substantially non-fermentative refrigeration of milk immediately after its production and prior to its aeration, is not known by me to have been practiced. Moderate aeration and moderate cooling soon after milking is widely practiced. Accumulation of bacterial metabolic and decomposition products occur in and accumulate in milk in direct proportion to the number of infecting bacteria present, the temperature at which the milk is held, and the length of the time of its holding. Germs in milk held at a temperature of 30° F. proliferate very slowly, especially if the milk is fresh; but if the milk is held at the usually maintained temperatures of from 50° F. to 60° F., which temperature-holding inhibits the quick growth of acid forming bacteria, the proliferation of objectionable germs which produce botulism and so-called ptomaine toxic products, continues without being materially inhibited by the presence of the small amounts of lactic acid products produced by acid forming bacteria, which only proliferate freely at the temperatures of 60° F. or over; and which ordinarily, if present in large numbers, produce more or less acid that overcomes or prevents other more objectionable germinal growths. Furthermore, if milk has been Pasteurized and only the latic acid forming bacteria killed, and the milk is held at a temperature at which the undestroyed putrefactive germs will grow, objectionable bacterial products are formed, and may be in dangerous quantity.

While it is possible that a temperature of 45° F. is sufficiently low to secure reasonable safety in very clean milk if only held for a short time before consumption, as in the case of so-called "certified" milks, a temperature of 45° F. is not low enough to prevent some undesirable changes in moderately infected milk; nor to prevent serious changes, when applied to milk that has been more or less heavily infected by bacteria conveyed in barn filth and dust; and which abundant bacterial content superinduces damaging fermentations and following decomposition splitting of the protein constituents of destroyed milk bacteria, and hence produce bacterial excretory and decomposition products that are either unwholesome or virulently toxic. The great bulk of all market milk becomes heavily infected with those bacteria which decompose milk held at the temperatures generally maintained, and which temperatures while moderately inhibiting lactic acid fermentations, do not prevent other fermentations. It is now known that consumption of large accumulations of bacterial ferment products in milk, may produce serious damage in adults and even death; and it is reasonable to suppose that even lesser percentages of such toxic products, if repeatedly fed to infants for long periods of time in consecutive small amounts, may result disastrously to them. The symptoms of infants fed with bad milk are those of chronic continuous poisoning.

Inasmuch as more or less of the primary infections in market milk are usually practically unavoidable, the importance will be obvious of applying my method of mechanically produced substantially antifermentative deep refrigeration of milk, sufficiently soon after its drawing from the cow and before the milk has lost its self-preservative power, in order to minimize to the greatest practical degree the development of malign bacteria and toxic matters in the milk, which cannot be otherwise than more or less harmful when consumed. Furthermore, it will be seen that the refrigerative influence necessary to preventatively control these fermentations, should be continued up to the time of consumption, with such negligent intermissions as are necessary in the short times taken in heating lactic fluids up to a Pasteurizing temperature, and in reducing the temperature of the fluids after pasteurization, to antifermentative cold temperatures. In special cases, as in hospital practice, the last named refrigeration should be conducted by special methods at the place where the milk is consumed, and up to the moment of using the milk, inasmuch as ice-box temperatures are not sufficient intense to be practically anti-fermentative. An economic advantage of my method is that I secure sufficient refrigerative influence in the milk itself to preserve it thru various stages of its handling, instead of depending upon the clumsy, inconvenient and expensive method of icing influence intermittently applied from without the milk. The icing process is more expensive, and is not sufficiently effective as a rule in preventing fermentation, altho it may be sometimes applied with advantage in conjunction with my method of refrigeration.

Desirable temperatures.

To secure the temperatures required to carry out my method in its fullness, repeated mechanical refrigeration is desirable. The degrees of temperature which I apply will vary according to conditions, such as the length of time during which the fluid is to be held during its transportation, or during its treatment at the distributing plant, and during its distribution. According to circumstances, temperatures ranging between 29° F. and 40° F.; and between 110° F. and 150° F. are to be considered as being sufficiently intense controlling temperatures. It is well known that the distribution of milk in sealed glass bottles is a valuable method in preventing deteriorations in milk; but it is not generally known that Pasteurization does not destroy a certain proportion of the germinal infections in milk, and that such undestroyed residue may vary from 1% to 5% of the primary or proliferated infection. On that account, deterioration in bottled milk that has been Pasteurized, occurs during the distribution of the milk, if it is held at the usual moderate holding temperatures; at which bacterial incubation is not inhibited. So far as I know, in no case in the prior practice of treating milk, including its distribution, has there been practiced the basic idea of a practically continuous deep, substantially non-fermentative refrigeration of the milk from the time of its production up to the time of its delivery to the consumer. The moderate cooling of milk may retard all bacterial growths, but does not entirely prevent the growth of some germinal varieties, especially after milk has lost its self-preservative character which usually exists for several hours after the drawing of the milk. If milk is held at or near to 29° F., its usual freezing point, such growths are so slow in occurrence as to be practically negligible if the milk is consumed in a reasonably short time after production; but every degree of frigidity that can be practically applied, is of material advantage. While there is a general opinion held that milk should be kept very cool during its transportation and holding, as a matter of fact, the generally held opinion is that "very cool," means temperatures of from 45° F. to 60° F.; 45° F. being regarded as an excellent degree securable by icing, tho with difficulty.

In the production of market milk for infant feeding, where special protection against toxic contamination is a vital matter, I adequately refrigerate the milk immediately after its production, and preferably, with closely immediate aeration and Pasteurization. Preferably in the general milk supply, I hold the milk at a substantially non-fermentative temperature until it reaches the distributing plant. This practice necessitates the use of a mechanical refrigerator at the point of the production of the milk.

The aeration, Pasteurization, and refrigeration of the milk under my method, is advantageously performed in a continuous process in one apartment in a manner hereinafter described. Infants' milk should in connection with its mechanical refrigeration, be also protected by direct icing contact with the container to prevent loss of frigidity; or by adjuvant mechanical refrigeration on its journey to market and up to the time immediately prior to its consumption, whether it be transported in small bottles or larger containers.

In the treatment of ordinary market milk by my method, the farmer-producer is expected to cool his milk with cold well water, and preferably, with water that is iced; and to secure its delivery to the shipping station before the milk has lost its antiseptic character and before any or at least much increase in its bacterial content has occurred. In my method, at the shipping station the milk in large enclosed shipping containers is submerged in tanks containing a germicidally strong brine solution, cooled approximately to 30° F. or lower, which cooling is quickly secured and in needed intensity, by a co-operating connected mechanical refrigerating apparatus. The milk containers are held in the solution until the milk is sufficiently cooled to warrant their shipment and preferably is chilled to at least approximating 29° F., the temperature selected however may be lower, it being somewhat in harmony with the length of travel of the milk to market and the atmospheric temperatures that will be met during the travel. Thru my method, the required traveling depth of temperature can be more quickly and accurately secured in the milk, than by its cooling with iced water. Typhoid and other infections of the pouring surfaces of the containers are also prevented by using the antiseptic brine solution. Mechanical refrigeration is preferably performed at the point of shipment, during the transportation of the milk, at the delivery station, and again at the point of distribution to consumers, the latter refrigeration being preferably applied to the milk in the final distributing container. It is the usual practice of dealers during the distribution of milk, to distribute it to the consumer in a state of temperature that does not prevent the growth of undestroyed bacteria in the bottled product. To prevent all infections proliferating in milk, I carry out in combination, all the steps needed to secure the desired result, including an efficient refrigeration in the final container. There has been no previous appreciation of the fact that any change whatsoever in normal, fresh, good quality of milk, injures its character as to wholesomeness and edible excellence. In my method, the milk can be conveyed to the distributer in super-large bulk containers if such containers are insulatively protected against heat. If the milk is conveyed in ordinary size containers and in carload lots, and in a deeply refrigerated condition, only ordinary insulative and refrigerative influences are necessary in the transporting car. I do not as a mere saving in labor, convey milk or other lactic fluids in large bulk if it is practically impossible to control its temperature within non-fermentative degrees.

Preferably, in milk trains traversing great distances I provide mechanical refrigerating apparatus operating on the train itself. In this way the temperature in each car can be accurately and positively controlled; and the plan will be found more economical and effective than the icing methods used on ordinary milk trains. The milk is received at the railroad receiving station in an enclosed insulated building, mechanically refrigerated during warm weather, and artificially warmed sufficiently to prevent the milk freezing in cold weather, the idea being that even during temporary holding of the milk, it should be held at a temperature as near to 29° F. as may be practicable. The vehicles transporting the milk from the railroad station to the distributer's plant, are insulated to prevent any unnecessary heating of the milk during that stage of its conveyance. In my method, milk modified for infant feeding at and distributed in small bottles from central laboratories in small cases, besides being mechanically refrigerated, should be delivered with cracked ice packed over the bottles in the cases, which ice should be renewed by the consumer until the milk is all used. Details as to this feature of my invention are described in my Patent No. 1,447,251. The depth of refrigeration that I continuously or intermittently maintain, is such that no material damaging change in the character of the milk during the time of its conveyance to the consumer can be practically detected.

*Modified temperature control.*

Under some conditions, I control the temperatures of lactic fluids, especially cream that is to be made into butter, by maintaining the cream for a certain time at temperatures favorable to lactic acid bacterial incubation. In many farming districts where individual farmers of cleanly dairy habits only keep small herds of cows, and who market their cream at central butter making plants, I adopt the following practice, viz: immediately after the separation of cream from milk, I reduce the temperature of the cream to a degree that is substantially obtainable by well-water; 60° F. being a preferable temperature, and if the cream is transported to the churning plant within two or three days, I allow a moderate lactic acid fermentation to occur in the cream. If the cream is only to be conveyed to the churning plant less frequently, say once in every seven days, I hold the cream at a lower slower fermenting temperature, and preferably, at a temperature of about 45° F. which is maintainable thru the use of iced water. In such pre-churning treatment of cream, every fresh batch of cream separated, is at once cooled to a well-water or lower temperature, and is then intimately admixed with previous batches of cream that are being held. If the cream that has undergone a moderate lactic acid fermentation is to be transported long distances to a churning station, the cream should be sufficiently reduced in temperature before transportation, to prevent undue acid production in it, and practically, no putrefactive fermentation. At the churning station, creams of various degrees of lactic acid fermentation are placed in separate cream vats; and unless further lactic acid fermentation is desired, the temperature of the cream in any vat is reduced to and held at a substantially non-fermentative temperature until the cream is to be churned. The idea of using several cream vats is to secure a uniformity of churnable quality in all of the several productions of creams; inasmuch as exhaustive churning is more easily effected if all the cream introduced in the churn for one churning, is at one stage of fermentative ripening.

*Aeration.*

The process of eliminating by aeration objectionable animal and other volatile diffusive matters contaminating milk, if practical, should be conducted at the point of the production of the milk. It is frequently partially conducted there, but without antiseptic precaution against aerial infections. Inasmuch as this is frequently impractical, and as the sequence in which the steps of my method is effected, is not vitally important, I usually recommend that the aeration of lactic fluids be conducted at the milk purveyors' or butter making plants, using special apparatus adopted for that use; and preferably, in close connection with the Pasteurization of such fluids. Such aeration may be performed in various ways; preferably it should be effected while milk retains the self-preservative character which exists for several hours after milking. But the aeration may be delayed for days if milk, or cream, is sufficiently preserved by a temperature-control that prevents fermentation. One method is to blow filtered air thru the fluid; and this acts well in connection with the aeration of cream in large churning plants. Preferably, in aerating milk, I run the milk circuitously for a sufficient number of times over an adequate extent of aerating surface in an apartment having an atmosphere of a temperature suited for the purpose in view. The temperature of the atmosphere may be such as to secure the aeration of milk or cream while holding the temperature substantially at a non-fermentative degree. The atmosphere may however be heated even up to a Pasteurizing temperature if haste is desired in aerating and Pasteurizing the fluid. In some instances, it may be desirable to aerate the fluid at a temperature below 40° F. until the volatile diffusive contaminants in the fluid are exhaustively, completely eliminated, which may require considerable time. The method of aeration I prefer, varies according to conditions. Under ordinary conditions prevailing at central stations, milk or cream received in large transporting containers, to avoid a churning action of the fluid, may be raised in the containers in an elevator, and poured into a mixing and holding vat in a cooled apartment above the level of an aerating apparatus over which the milk is gravitated in a controlled rate of flow. Or preferably; the milk can be dumped into a receiving vat at a lower level and then be pumped circuitously from the vat up to and be gravitated repeatedly over the aerating surface until the elimination of the volatile contaminants is effected; and in such case, the milk can be brought to a Pasteurizing heat in the same vat. In such case, I use an ordinary rotary milk pump. In aerating cream, I may force filtered air under high pneumatic pressure into the cream in the vat; or, I may use an apparatus which applies the principles which are illustrated in my Patent No. 1,447,252; but preferably, in the case of cream, I use the apparatus described in the present application, especially if only moderate amounts of cream are being treated. In larger cream treating plants, I may use positive compression blowers for forcing air thru the cream, in combination with the use of an air conditioner for purifying the air used; or, in very large plants, I use ordinary large volume, rotary blowers, run at high rates of speed, for forcing the air thru the cream. The apartment in which the aeration is effected is provided with air filtering screens, so that floating dust and bacteria are filtered from the introduced fresh air I use in aerating lactic fluids. In the cold aeration of such fluids, the temperature of the aerating apartment is preferably as low as 30° F. Usually the refrigerative influence is derived from refrigerating piping so placed and arranged on the walls of the apartment, that the milk being treated is aerated by the cold air occupying the space between the coils of piping and the aerating surfaces.

In that case it is the cooled atmosphere that is brought into contact with the milk, and not as is usual, very cold refrigerating surfaces that are brought into direct contact with the milk. In the same indirect way I apply heating influences. In either way I apply large volumes of more moderate temperature influence, instead of small volumes of intense temperature influence, as is usual; and I effect the aeration more positively and actively at a non-fermentative temperature, and also secure a deeper refrigeration of the milk than is possible if the milk is run in direct contact with refrigerating surfaces; for in my new method, besides avoiding such infections as are usual in its aeration, I avoid freezing milk upon the refrigerating surfaces, which would otherwise occur in securing a desirably low temperature in the milk. Such an aerating apartment is furnished with mechanical means for continually changing its atmosphere; or the air may be moved mechanically; or, by gravity between the aerating surfaces and refrigerative piping, dependence being then placed upon the condensation of the fumes and moisture from the milk, upon the refrigerative piping. In the latter case, the aerative atmosphere is used in cycle; and that plan I consider to be more economical and certain in avoiding bacterial infections during the aerating process, than by continually changing the atmosphere of the apartment. In preventing infection during aeration, I may apply the same principle in aerating milk or cream in hot atmospheres without infecting any portion of the fluids aerated. In that case, hot water or steam coils replace the refrigerative piping.

Where quickness of operation is required, and in which the process of aeration is coincident with the primary heating of the milk and its immediate subsequent heating to a Pasteurizing temperature, I practice the hot method of aeration. Heretofore it has not proved to be desirable to aerate and Pasteurize in one operation, because of subjecting the milk to possibilities of infection during the process; but in the present instance I show a practical method of aeration followed by immediate Pasteurization; and if necessary, aeration during Pasteurization, and during cooling of the milk after Pasteurization. In case of the hot aerating method, the air of the apartment is not used in cycle, it being replaced continuously by gravity forcing fresh air upwardly thru the aerating apartment. In some instances, it is desirable to coincidently aerate and preheat milk before placing it in the final containing bottles, and then to continue the heating to a Pasteurizing degree in the bottles. In this method, the milk for a short time will have a fermentative temperature before it acquires a sterilizing heat; but if a large extent of aerating surface is provided in the aerating apartment, and large amounts of filtered air are passed thru the apartment, only a negligible amount of fermentation will occur in the milk before it is heated sufficiently to destroy pathogenic germs in it. In very large milk handling plants, this modification will probably be the one usually practiced, because of the economy in the primary heating of the cold milk. In case the milk is not to be Pasteurized in the bottle, it can be Pasteurized in the aerating apartment, as well as cooled therein.

Pasteurization.

This invention may sometimes obviate the necessity of Pasteurization, thru elimination of some of the objections to raw milk that are held by many physicians. But most sanitary experts of recognized eminence hold that all market milk should be Pasteurized; and preferably, that it should be Pasteurized in the final container. The present invention has been developed with the recognition of the desirability of Pasteurizing all lactic fluids, in order to overcome the possible dangers of pathogenic infections during production and handling, and to overcome defects which have pertained to prior methods of practice. The Pasteurization of milk has hitherto been mostly practiced in order to prevent its souring. As a matter of fact, unless milk has had proper refrigerative treatment both before and after Pasteurization, Pasteurization may be a source of danger, inasmuch as Pasteurization destroys most of, if not all of the acid forming bacteria, which if present, thru their acid forming growth prevent the fermentative increase in the milk or other infections that are dangerous, or otherwise undesirable. Hence will be perceived the coordinate importance of my steps of applying substantially non-fermentative low temperature refrigerative influences both before and after Pasteurization. After the milk is aerated, and if it is not to be sold in bulk as unpasteurized milk, to avoid breakage of bottles, it is bottled while cold, or at a temperature not greatly higher than the temperature of the atmosphere in the room in which the milk is being treated. It is desirable that the milk should be Pasteurized in the final container in which it is to be delivered to the consumer, and after the closure of the container is sealed, so that possible infections from uncleanly returned bottles, or from atmospheric sources, or from the hands of distributing agents, or from insects or other sources, may be over come. In preventing fermentative changes in milk I heat it somewhat quickly in its Pasteurization, and then cool it as quickly as may be practical to a substantially non-fermentative temperature after its Pasteurization.

Distribution.

An important part of my invention is the deep refrigation of the milk in the final container prior to its distribution to the consumer, and whether the milk has been pasteurized in the bottle or not, in order that the growth of the residue of the bacteria which survive Pasteurization, may be inhibited. This should be done in a refrigerated apartment. When removed from the apartment for distribution, the bottled milk is placed in insulated closable delivery cases, that are lined with sheets of insulating material like compressed cork.

Figure 2:
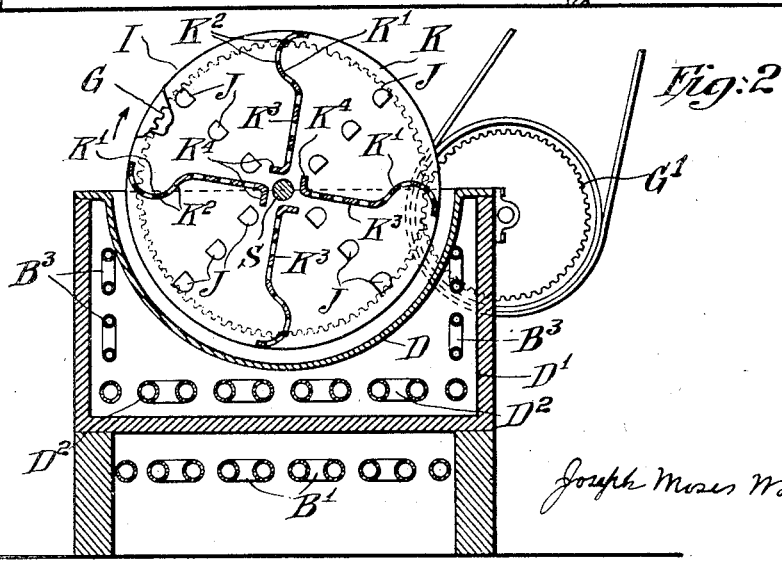

The accompanying drawing indicates an embodiment of that part of my invention in which lactic fluids are aerated, Pasteurized and cooled in continued successive steps. Fig. 1 represents in vertical cross-section a plant for carrying out aeration, Pasteurization and cooling. Fig. 2 represents on a larger scale, a cross-section of a fragment of the plant shown in Fig. 1, taken on the line 2—2 in Fig. 1. The reference characters indicate as follows: A is an aerating and Pasteurizing closable apartment. $A^1$ are screened air inlets admitting air into the space $A^2$ below the apartment A. $A^3$ is an air opening thru the floor F. $A^4$ is a dust and bacteria screen. $A^5$ is a vestibule entrance. $A^6$ is an exhaust fan. $A^7$ is an exhaust air trunk which leads to the screened air exits $A^8$. B is a steam boiler which heats the plant. $B^1$ are steam heating coils. $B^2$ is a steam supply main. $B^3$ are refrigerating pipes. $B^4$ is a condensed steam return conduit. $B^5$ is a water draw-off for the heating system. $B^6$ is a refrigerated brine tank connected with the brine pipes $B^3$. C is an entrance door leading from the vestibule $A^5$ into the apartment A, the interior of which can be observed thru the glass panel $C^1$ without entering the apartment. D is a cream vat. $D^1$ is the vat jacket. $D^2$ is the jacket heating coil. F is the floor of the apartment A. G is a large gear wheel. $G^1$ is a small gear wheel. H are steam headers. I is a rotary aerator and mixer, of which K, K, are the ends of the rotor. J are pockets for the indrawing of cream from outside to the inside of the rotor I. $K^1$ are troughs for elevating the fluid from one side of the vat to above the level of the fluid. $K^2$ are perforations thru which part of the fluid gravitates in small streams back to the level of the fluid in the vat D, the balance gravitating over the aprons $K^3$ and the lips $K^4$. P is a pulley. S is the rotor's shaft. $S^1$ is a counter-shaft. V are steam valves. $V^1$ are air valves. W are screened windows which can be opened in cooling and cleaning the apartment A. In operating the plant, fire is started in the boiler B, and cream is dumped into the vat D, the jacket of which is heated by water vapor vaporized by the steam coil D² in the jacket D¹. When the air of the apartment is heated, its temperature is controlled by introducing steam in one or more of the heating pipes B¹. The air in the apartment becoming more heated and expanded than the cooler external atmosphere, is forced upwardly and displaced by the colder outside atmosphere. The air entering the screened apertures A¹ and becoming partly heated by the condensed steam coil in the space A², passes thru the screen A⁴, is forced upwardly and finds exit thru the trunk A⁷ and the outlets A⁸. If milk or cream is aerated at cold temperatures, the exhaust fan A⁶ is operated; and the room is cooled by the refrigerative piping B³ connected with the refrigerative brine tank B⁶, the flow from which is controlled by the valve B⁷. The rotor I is operated by power transmitted from the counter-shaft S¹ and belting S². In the rotation of the rotor I, the cream is lifted above the general level of the fluid at one side of the vat and is gravitated thru the many openings K² and over the aprons K³ and the lips K⁴, and running downward toward the central shaft S to the level of the cream in the vat. When the convexities of the troughs K¹ reach the level of the fluid at the other side of the vat, air is forced down below the level of the fluid, and air bubbles up thru the fluid from the perforations K². As the rotor revolves, the effect of the troughs and the aprons as well as the pockets J, is to revolve the whole bulk of the fluid in the vat D, and keep the fluid admixed in the operation, but without violent churning motion, which in the case of cream, is a desideratum in avoiding incomplete churning of the butter fat in the cream.

Subject matter is herein disclosed which is not claimed herein, but which will be claimed in my copending applications already filed.

What I claim as new is:

1. The method which consists in subjecting a lactic fluid before the fluid has lost its self preservative character, to a preservative temperature-influence that will substantially inhibit bacterial incubations in the fluid, and maintaining such preservative influence with substantial continuity until the time of the delivery of the fluid in marketable form to the consumer, said method comprising successively and coactively the steps of cyclic aeration and Pasteurization thru heating, and prompt refrigeration after the heating of the fluid to a temperature lower than what can be produced by icing, said method being performed in an atmosphere free from objectionable odors and from which atmosphere bacteria and dust have been screened.

2. The method which consists in subjecting a lactic fluid before the fluid has lost its self preservative character, to such a temperature influence that bacterial incubation is substantially inhibited in the fluid, exhaustively eliminating volatile gaseous contaminations from the fluid, Pasteurizing the fluid, cooling the fluid to and maintaining the resultant product at a temperature that substantially inhibits bacterial incubation in the product until the product is delivered to the consumer.

3. The method which consists in refrigerating a lactic fluid prior to its loss of self preservative character, to a temperature lower than 40° F., aerating the fluid in an atmosphere free from live germs and of a temperature substantially inhibiting bacterial growths in the fluid during the aerating process, Pasteurizing the fluid, again refrigerating the fluid and to a temperature between 29° F. and 40° F., and distributing the resultant product in such state of frigidity.

4. The method which consists in introducing filtered air into a closable apartment, controlling the temperature of the filtered air, introducing a lactic fluid into said apartment and bringing the temperature controlled air into intimate contact with the fluid in the apartment, said fluid being aerated in said air but being protected in its aeration by the interposition of the air from direct contact with the means of controlling the temperature of the air.

5. The method of aerating and Pasteurizing a lactic fluid, which consists in maintaining a circulatory flow of the fluid across a relatively horizontal plane by lifting the fluid above the plane at one border of the plane, precipitating part of the fluid in multiple finely divided streams thru air to the level of the plane and gravitating part of the fluid in a relatively horizontally disposed sheet towards the other border of the plane, and submerging air in bulk below the level of the surface plane of the fluid at the other border of the plane and bubbling the air upwardly thru the fluid from many bubbling points to aerate the fluid and admix the various portions of the fluid, and Pasteurizing the fluid.

6. The method which consists in coincidently heating and aerating a lactic fluid in a cyclic flow over aerating surfaces and precipitating the fluid in multiple streams of small diameters and bubbling air upwardly thru the fluid.

7. The method which consists in reducing the temperature of a lactic fluid below 45° F. thru the use of ice, giving the fluid a further reduction in temperature that is substantially inhibitive of bacterial growths and aerating the fluid with bacteria-free air, Pasteurizing and coincidently purifying the fluid by further aerating the fluid, and cooling the fluid to a definite desired temperature.

8. The method which consists in forcing purified air into and thru a lactic fluid to exhaustively eliminate gaseous contaminants from the fluid by aerating the fluid, and removing the contaminated aerating air from the fluid.

9. The method which consists in effecting and maintaining a substantially non-fermentative temperature in milk before the milk has lost its anti-fermentative power, clarifying the milk, exhaustively and coincidently eliminating gaseous contaminants from and Pasteurizing the milk, and separating cream from the milk, said clarification, aeration, Pasteurization and separation being effected in an atmosphere from which dust and bacteria have been eliminated.

JOSEPH MOSES WARD KITCHEN.